United States Patent [19]

Herchenbach

[11] 4,257,243
[45] Mar. 24, 1981

[54] HOMOKINETIC DOUBLE JOINT FOR WIDE BENDING ANGLES

[75] Inventor: Paul Herchenbach, Ruppichteroth, Fed. Rep. of Germany

[73] Assignee: Jean Walterschied GmbH, Lohmar/Rhlid., Fed. Rep. of Germany

[21] Appl. No.: 4,268

[22] Filed: Jan. 17, 1979

[30] Foreign Application Priority Data

Jan. 21, 1978 [DE] Fed. Rep. of Germany ....... 2802572

[51] Int. Cl.³ ........................... F16D 3/26; F16D 3/34
[52] U.S. Cl. .................. 64/17 R; 64/17 SP; 64/21
[58] Field of Search ...................... 64/17 R, 17 SP, 21; 180/14 R, 14 D, 53

[56] References Cited

U.S. PATENT DOCUMENTS

| | | | |
|---|---|---|---|
| 724,068 | 3/1903 | Williams | 64/21 |
| 1,389,970 | 9/1921 | Noel | 74/385 |
| 1,774,679 | 9/1930 | Swenson | 64/17 SP |
| 1,979,768 | 11/1934 | Pearce | 64/21 |
| 1,987,807 | 1/1935 | Swenson | 64/17 SP |
| 2,067,286 | 1/1937 | Pearce | 64/21 |
| 2,755,641 | 7/1956 | Dunn | 64/21 |
| 3,470,712 | 10/1969 | Geisthoff et al. | 64/21 |

FOREIGN PATENT DOCUMENTS

| | | | |
|---|---|---|---|
| 1302735 | 8/1971 | Netherlands | 64/21 |
| 91751 | 5/1972 | Netherlands | 64/21 |
| 92614 | 12/1972 | Netherlands | 64/21 |
| 991346 | 5/1965 | United Kingdom | 64/21 |

*Primary Examiner*—Henry K. Artis

[57] ABSTRACT

In a homokinetic double joint for effecting wide angle bending in the drive transmission line between a drive member and a drive member, such as in the combination of an agricultural tractor and driven agricultural device, a pair of outer yokes are each connected to a double inner yoke by two cross-links. A ball trunnion on each outer yoke is held within a guide member in a centering disc secured in the double inner yoke. Each cross-link has two pair of trunnions, one pair connected into the sides of the outer yoke and the other pair connected into the sides of the double inner yoke. The spacing between the sides of the double inner yoke in which the trunnions are positioned is greater than the spacing between the sides of the outer yokes in which the trunnions are held, thereby permitting wider bending angles between the drive member and the driven member.

3 Claims, 4 Drawing Figures

HOMOKINETIC DOUBLE JOINT FOR WIDE BENDING ANGLES

SUMMARY OF THE INVENTION

The present invention is directed to a homokinetic double joint or constant velocity joint for wide bending angles, particularly between the drive unit and driven unit in an agricultural machine. The double joint includes a double inner yoke and two outer yokes each of which is connected to the inner yoke by a cross-link. Each of the outer yokes has a ball trunnion on its end extending into the inner yoke. The ball trunnions are each engaged in a guide member positioned in a centering disc secured in the inner yoke. While the centering disc is movable in the radial direction of the inner yoke, it is secured against axial movement.

Homokinetic double joints are frequently used in practice for wide bending angles. In such instances they are referred to as so-called wide-angle joints.

A homokinetic double joint with positive guidance of the outer yokes afforded by ball trunnions are known where the trunnions are received in a centering disc having cylindrical bearings. The bearings are arranged perpendicularly to the centering disc. The ball trunnions are guided in a plane which bisects the angle formed by the ends of the shafts, note German Auslegeschrift No. 1,302,735, Federal Republic of Germany.

In such a double joint, it is possible, when all of the designed possibilities are utilized, to achieve a bending angle of 90° in the plane of the axes of the trunnion bearings located in the two outer yokes. It is impossible, however, when adhering to the design principles involved to come close to the bending angle of 90°, because the angle is limited by the possible range of traverse of the ball trunnions.

Therefore, it has been suggested to construct a wide-angle joint with a guide member consisting of two external toothed segments, which segments mesh with one another, note U.S. Pat. No. 1,389,970. This particular arrangement is disadvantageous because the external guide members can only be pivoted in one plane and, in addition, the entire joint is very large. Such joints are not suitable for connecting an agricultural implement to a tractor, since they cannot absorb any relative movements in all of the planes of movement between the tractor and the implement.

In another proposed double joint, the cross-links were constructed as eccentrics, that is, the axes of the trunnions did not intersect in a point, note the article "U er Doppelgelenke mit Exzenter im Gelenkkreuz", Automobilindustrie, April, 1972. Double joints of this type, however, have a significant disadvantage that, in dependence on the magnitude of the bending angle, axial movements must be absorbed in the universal joint shaft and there is eccentric movement of the yoke end, that is, lateral oscillations. This arrangement is not suited for agricultural use where large bending angles occur, such as when an agricultural unit consisting of a tractor and a trailed agricultural device is turned at the end of the field.

In the German Democratic Republic Patent No. 92,614 a wide-angle joint is disclosed in which the outer yokes are provided with external guide members which point inwardly and embrace both sides of the ball ends arranged in a radially slidable centering disc. The bending angles which can be achieved in this embodiment are limited and are in the range of only slightly more than 70°.

In another German Democratic Republic Patent No. 91,751, a homokinetic double joint is shown in which the inwardly pointing end face of each of the two outer yokes mounts a mushroom-shaped centering element with a modified bevel gearing. In this arrangement the centering elements engage each other at any bending angle and center the double joint. As mentioned with regard to the immediately preceding embodiment, such a double joint can only achieve a bending angle of slightly more than 70°.

In British Pat. No. 991,346, a so-called double Hooke's joint is disclosed for providing a homokinetic movement and the outer yoke is connected to the significantly smaller inner yoke via a frame-like rocking member. The frame-like rocking member is received in the outer yoke by two outwardly directed trunnions located at the rocking member. The spider is located in the interior of the outer yoke and is supported within the rocking member by two trunnions which are located opposite one another and spaced further apart. The inner yoke is supported by the spider on the two trunnions which are located opposite one another and have a smaller distance between them.

In this embodiment there is the disadvantage that all of the trunnions are arranged in a single plane and, therefore, for reasons of space there are large differences between the trunnions which are related. In the actual design, the distance between the trunnions on the rocking member which point outwardly and cooperate with the outer yoke is twice as large as the distance of the trunnions on the spider in which the inner yoke is supported. Accordingly, relative to the torque which can be transmitted, the structural size of the joint is oversized by approximately 100%, since the torque is determined by the strength of the support for the inner yoke on the trunnions of the spider with the smaller spacing. Therefore, the ratio of the radii of the torque transmitting bearing parts acting as lever arms is extremely disadvantageous in this arrangement. Moreover, the production of double Hooke's joints is very complicated, since a large number of individual parts must be adjusted relative to one another.

The above-mentioned British patent is directed to providing a joint with homokinetic properties without taking into consideration the problems concerning manufacture and use. Furthermore, this homokinetic joint is unable to adjust to large bending angles, since the arrangement of three supports on different diameters in one plane makes it impossible to meet such a requirement.

All of the constructions known in the past have had the object of providing a wide-angle joint capable of permitting very large bending angles, however, they were unable to afford an effective bending angle of at least 90° for a full turn of the joint. In operation, as is frequently the case in agricultural uses where a tractor pulls a trailed device for effecting cultivation, the angle formed between the tractor and the device may become very small and, as a result, the turning circle diameter of the tractor as determined by the tractor design was limited to the bending angle afforded by the universal joint shaft. Since the tractor operator is additionally occupied, particular when turning a unit including a tractor and trailing equipment, such as when lifting the equipment from the working position, it often occurs that the universal joint shaft is ruptured when a very small turning diameter is used. As is evidenced by the large number of proposed joint arrangements, great efforts have already been made to provide wide-angle joints which meet the above-stated requirements. In spite of all of these efforts, however, to date it has not been possible to ensure that the turning circle of the tractor can be fully utilized.

Therefore, it is the primary object of the present invention to provide an internally centered homokinetic double joint or constant velocity joint which can be used for especially wide bending angles, that is, a joint which is suited for use in a universal joint shaft serving as a drive transmission line between a tractor and an agricultural implement for cultivation. In particular, the double joint guarantees a bending angle of 90° or more with full rotation and where the space required for the joint arrangment is kept as small as possible, it assures, without any structural changes, a limited free space between the tractor and the implement.

Moreover, while meeting the above requirements, the weight of the wide-angle joint is kept as low as possible to ensure that the universal joint shaft can be manipulated manually as required in agricultural operations.

In accordance with the present invention, the problems experienced in the past are solved by providing a greater radial distance between the yoke sides of the double inner yoke than between the yoke sides of the two outer yokes. Accordingly, the effective distance between the bearings for the two pairs of trunnions in the cross-links held in the double inner yoke are pivotally arranged in two parallel planes and the effective distance between them is larger than between the bearings of the pairs of trunnions in the cross-links which are secured into the outer yokes.

This arrangement of the wide-angle joint of the present invention has the effect that bending angles of 90° or more can be maintained over a full turning circle which has not been possible in the known constructions. By utilizing all of the available construction possibilities, it was only possible to provide a joint with a bending angle of approximately 90° in the plane in which the axis of the bearing of the trunnions of the cross-link secured into the outer yokes are pivotally arranged. With the known measures, however, such a bending angle is not possible in the plane containing the axes of the bearings for the trunnions held in the double inner yoke.

A large bending angle is very advantageous when an agricultural implement is hitched to a tractor and is driven by a universal joint shaft from the power take-off shaft on the tractor. In practice, angles of up to 90° can be achieved between the tractor and its trailed implement. In the previously known joints, the tractor operator was required to check the angle between the tractor and the implement during travel around curve to prevent destruction of the universal joint shaft. It has become apparent, however, that this requirement expects jtoo much of the tractor operator in most cases, since he must also check the forward path of travel of the tractor and effect the switching on and off of the working action of the implement. Because of the various operations which had to be checked, it frequently happened that the universal joint shaft was bent or completely destroyed.

Moreover, by means of the wide-angle joint of the present invention and the increased bending angle which can be achieved, it is possible to follow the present trend of mounting, for security reasons (displacement of the center of gravity), heavy implements as close as possible to the tractor. The short connection length results in large bending angles, particularly when the implement has to be lifted out of the working position.

It is apparent that it is extremely advantageous to provide a bending angle of 90° which can be achieved for a full turning angle, without any reduction in the size of the structural components which perform the pivotal movements, since this would reduce the strength of the entire construction and, as a result, limit the torque which can be transmitted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
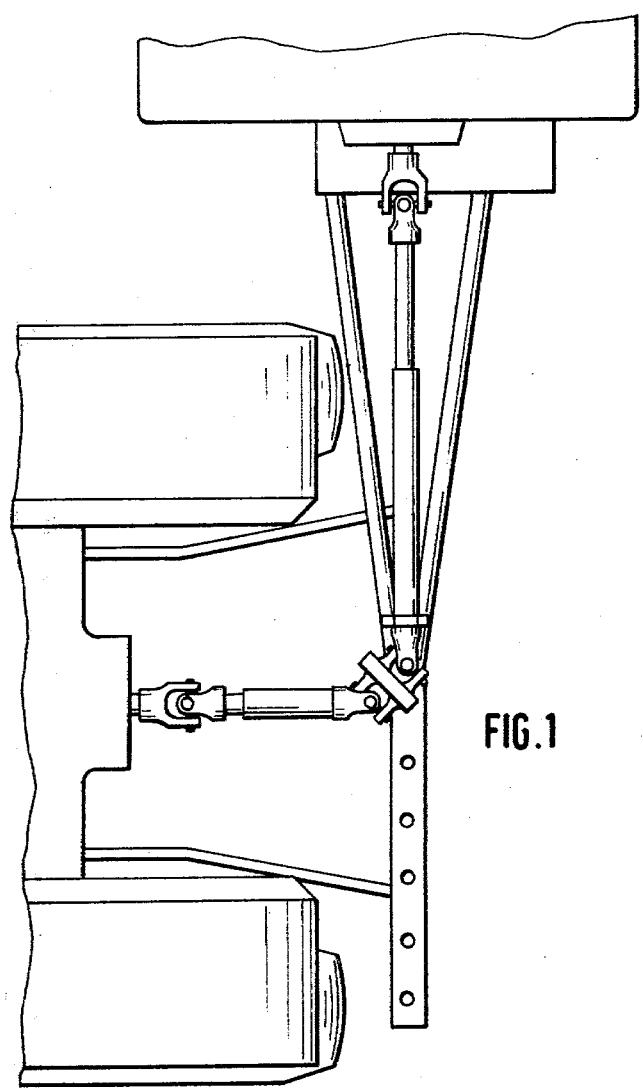
FIG. 1 is a partial plan view of a tractor pulling a cultivating implement through a circular path with a 90° angle formed between the tractor and the implement.

FIG. 1 shows an example of a wide-angle joint embodying the present invention, with the joint located in the drive shaft between a tractor and an agricultural implement pulled by the tractor.

Figure 2:
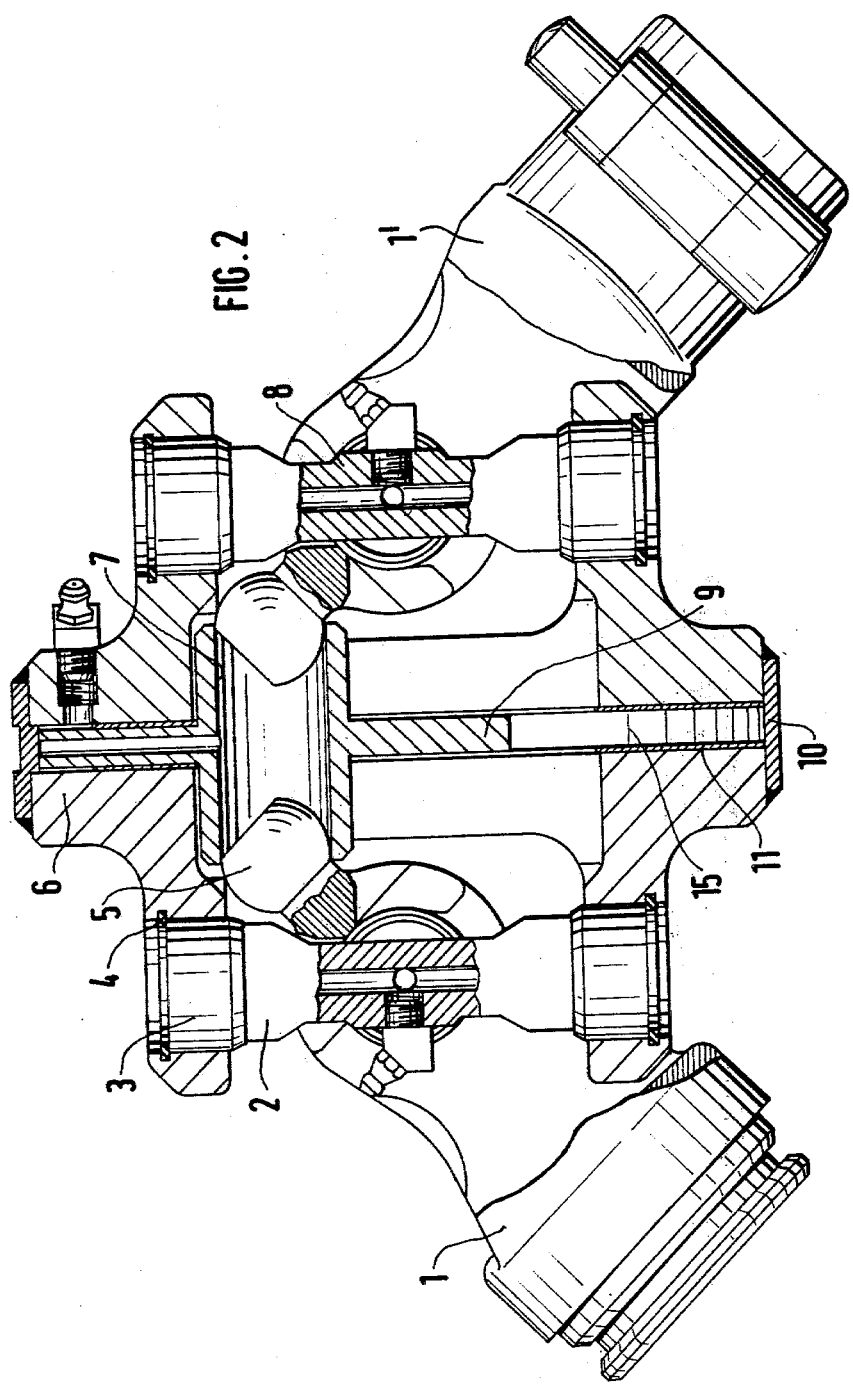
FIG. 2 is a sectional view through a homokinetic double joint embodying the present invention with the joint providing internal centering and disposed in a 90° bending angle in the plane illustrated.

In FIG. 2 the homokinetic double joint constructed as a wide-angle joint consists of two outer yokes 1, 1' each connected to a double inner yoke 6 by a separate cross-link 8. Each of the outer yokes 1, 1' has a ball trunnion 5 on its end extending into the double inner yoke 6. The two ball trunnions 5 are engaged in a guide member 7 forming a part of a radially slidable centering disc 9. The double inner yoke 6 has an axial direction extending between the outer yokes 1, 1' and a radial direction extending transversely of the axial direction. As indicated, the centering disc is movable in the radial direction, however, it is secured within the inner yoke 6 against any movement in the axial direction. The inner yoke 6 consists of two parts connected around their radial peripheries by a welded-on connecting sleeve 10. It would also be possible to connect the inner yoke halves by means of screws. The inner yoke halves form a cut-out 15 in which the centering disc 9 is freely movable in the radial direction but is secured against any movement in the axial direction. To prevent any wear in the side walls of the cut-out 15, hardened sliding discs 11 form the sides of the cut-out on which the centering disc 9 is movable.

Figure 3:
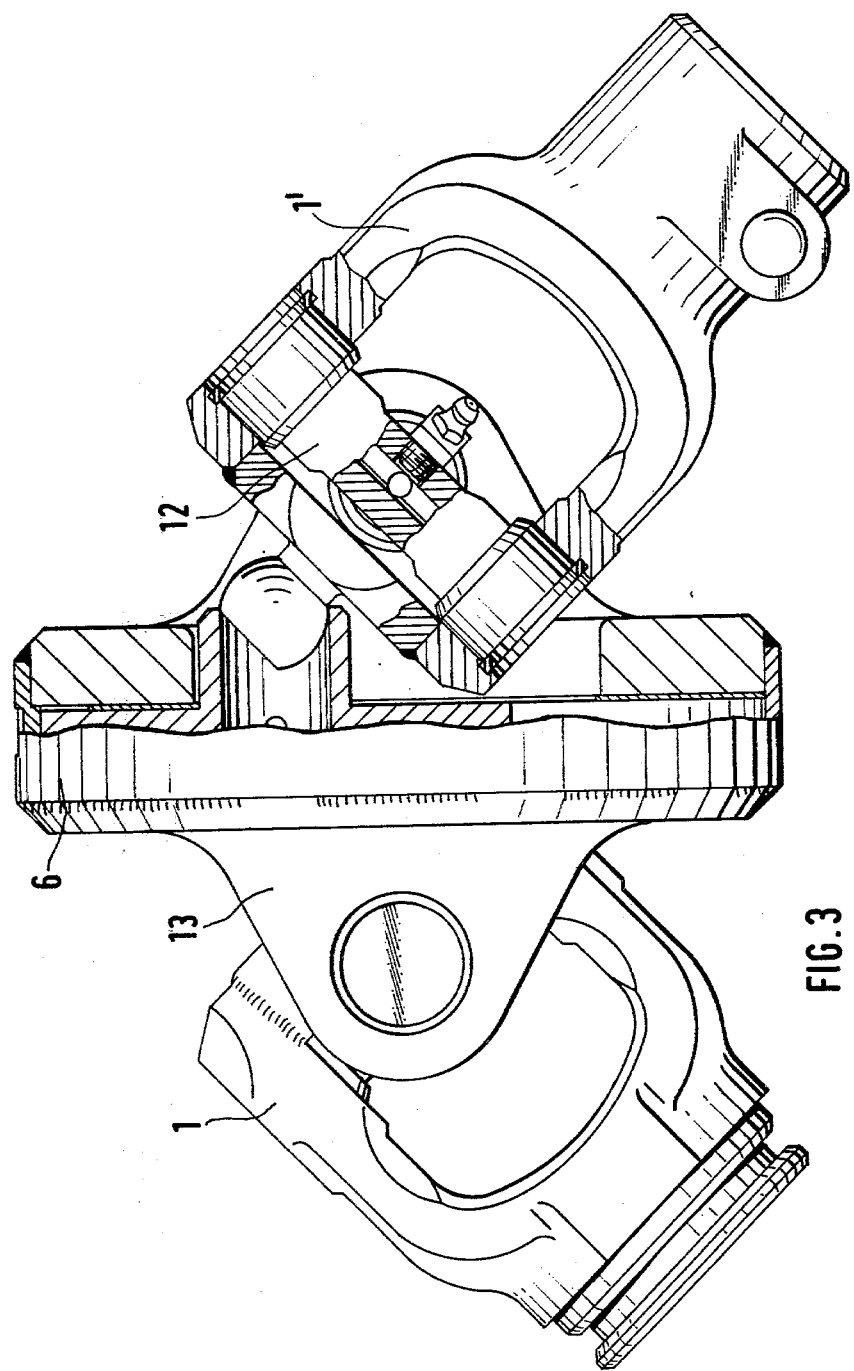
FIG. 3 is a view, partly in section, of the homokinetic double joint in a 90° bending angle in a plane perpendicular to the bending plane shown in FIG. 1.

Each cross-link 8 has two pair of trunnions 2, 12. Bearings, conventionally roller bearings, are mounted on the trunnions 2, 12. Outer bearing bushings 3, for the bearings, are secured in the yoke sides 13 and 14 against axial movement by means of spring rings 4. In FIG. 2 the homokinetic double joint is shown bent at an angle of 90° in the plane extending through the axes of the pairs of trunnions 2 of the two cross-links 8. In this particular plane, the bending angle is limited by the possible angle of traverse of the ball trunnion 5. When the homokinetic double joint is bent in a plane extending perpendicularly to the plane shown in FIG. 2, that is, in the plane as shown in FIG. 3, the magnitude of the bending angle is limited by the outside dimension of the yoke sides 14 of the outer yokes 1, 1'. As can be seen in FIGS. 2 and 3, the spacing between the yoke sides 13 of the double inner yoke is greater than the spacing between the yoke sides 14 of the two outer yokes 1, 1' by such an amount that the ball trunnions 5 can traverse an angle of at least 90°, wherein the diameter of rotation in this region is smaller than the maximum outer diameter of the double yoke resulting from its design. FIG. 3, as mentioned, shows the joint bent in a plane which is perpendicular to the bending plane shown in FIG. 2. In the plane of FIG. 3, a bending angle can be achieved with the known structural adjusting measures.

Figure 4:
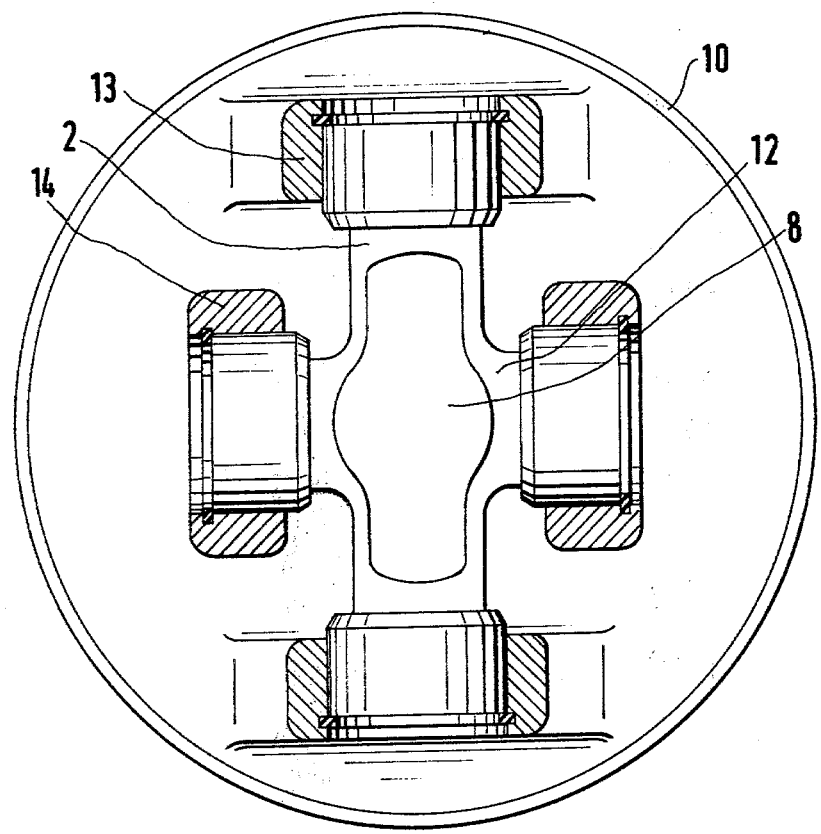
FIG. 4 is a partial sectional view of the homokinetic double joint embodying the present invention.

In accordance with the present invention, the cross-links 8 have a shape as shown in FIG. 4. The relative spacing between the sides 13 of the double inner yoke and the sides 14 of the outer yokes can be easily noted.

It can be appreciated that the inventive arrangement of a double joint can be used in other joint constructions such as internally toothed double joints.

While specific embodiments of the invention have been shown and described in detail to illustrate the application of the inventive principles, it will be understood that the invention may be embodied otherwise without departing from such principles.

In a typical cross link, the outside dimension of the trunnions extending between the sides of the double inner yoke is 78.2 mm while the outside dimension of the trunnion extending between the sides of the outer yokes is 57.2 mm. The distance between the bearing centers for the trunnion of the double inner yoke is 67.2 mm and for the trunnions of the outer yokes is 45.6 mm. The inside dimension of the yoke sides of the double inner yoke is approximately 56 mm, while the inside dimension of the yoke side of the outer yokes is approximately 34 mm. The distance between the centers of the bearings for the trunnions of the double inner yoke is approximately 40 percent greater than between the centers of the bearings for the trunnions of the outer yokes.

What is claimed is:

1. Homokinetic double joint for wide bending angles, particularly for the joint in a drive shaft between a drive member such as a tractor and a driven member such as an agricultural implement, comprising a double inner yoke, a pair of outer yokes, a pair of cross-links with each cross-link pivotally connecting one of said outer yokes to said double inner yokes with said outer yokes connected to said double inner yoke at spaced positions thereon, said double inner yoke having an axial direction extending between said outer yokes and a radial direction extending transversely of the axial direction, a ball trunnion on the end of each said outer yoke which is closer to the other said outer yoke, a centering disc positioned in said double inner yoke between said cross-links and said centering disc being secured against movement in the axial direction of said double inner yoke and being movable in the radial direction of said double inner yoke, said centering disc having a guide member therein and said ball trunnions engaged within said guide member, wherein the improvement comprises that each said cross-link comprises a pair of first trunnions and a pair of second trunnions extending transversely of said pair of first trunnions, said double inner yoke having two pair of sides with said sides in each said pair spaced apart in the radial direction of said double inner yoke, each said outer yoke having a pair of sides spaced laterally outwardly from said ball trunnion thereon, each pair of said first trunnions secured in said sides of one of said outer yokes, each said pair of second trunnions secured into one of said pair of sides on said double inner yoke, the distance between the sides of each pair of sides on said double inner yoke being greater than the distance between said sides of said outer yokes, a bearing for each of said first and second trunnions, said bearings for each said second trunnions of said pairs thereof being pivotally positioned in spaced parallel planes and the effective distance between the bearings of each said pair of second trunnions being greater than the effective distance between the bearings of each said pair of first trunnions.

2. Homokinetic double joint, as set forth in claim 1, wherein said ball trunnions within said guide member are pivotally movable through an angle of at least 90°.

3. Homokinetic double joint, as set forth in claim 2, wherein said guide member extends in the axial direction of said double inner yoke outwardly from each of the sides of said centering disc.

* * * * *